Nov. 27, 1945.   E. H. HELLER   2,389,779
COAL TRUCK UNLOADING DEVICE
Filed Nov. 17, 1944   9 Sheets-Sheet 1

Inventor:
Eugene H. Heller
By Wallace and Cannon
Attorneys

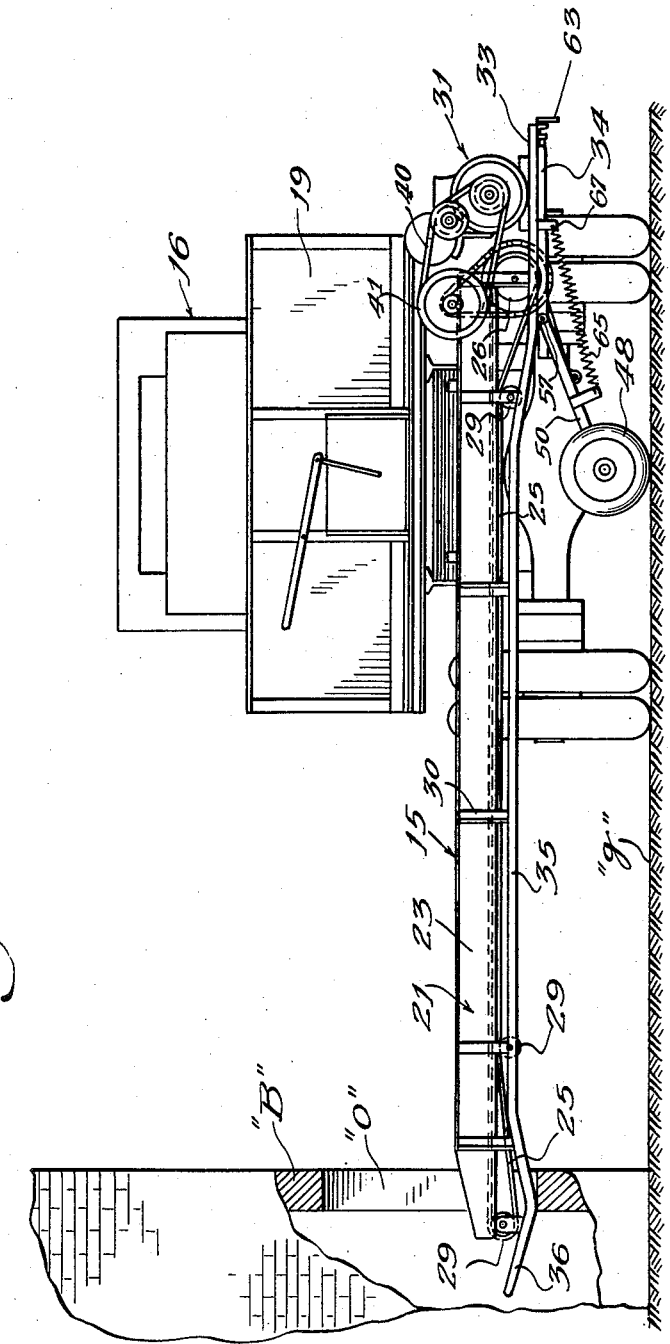

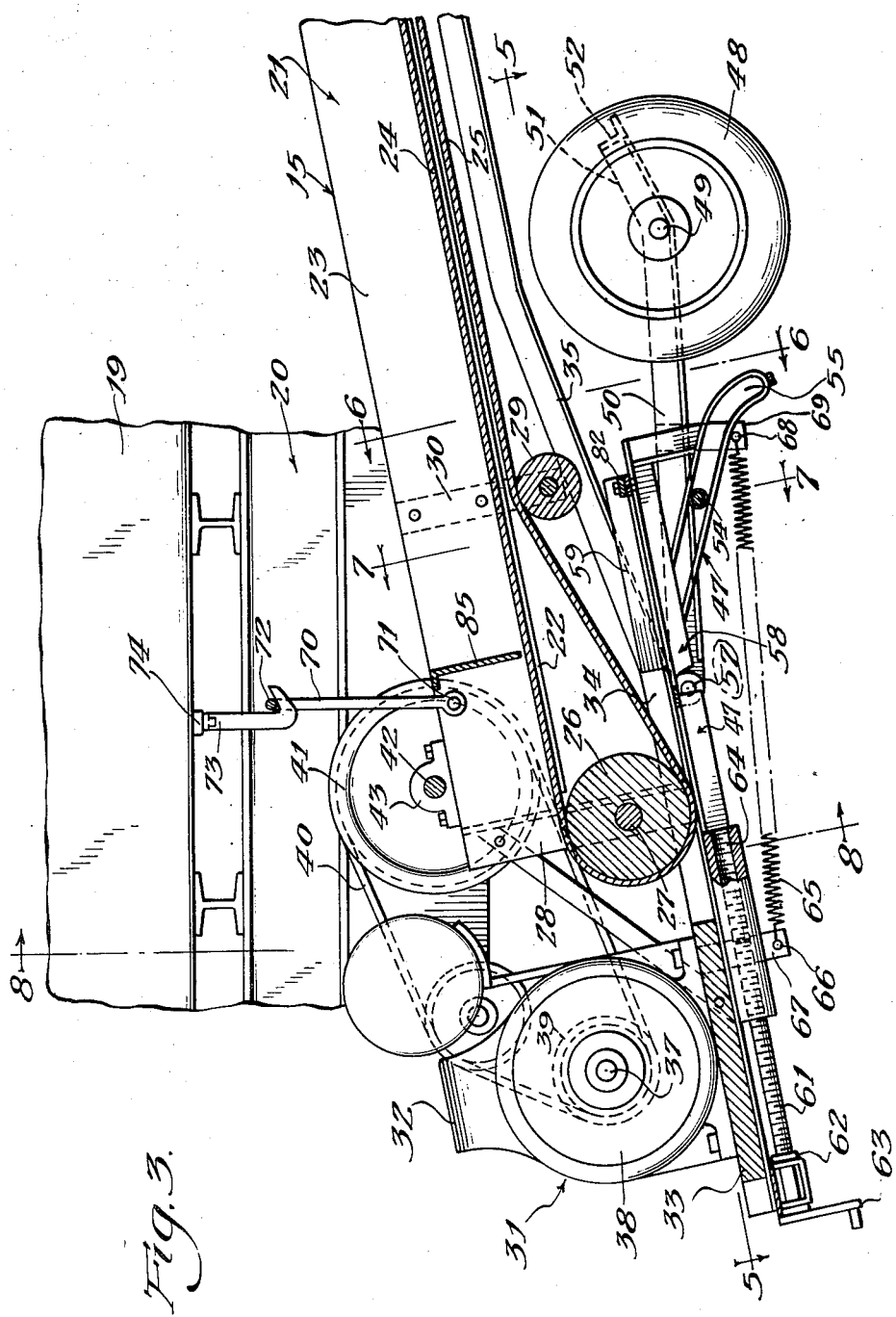

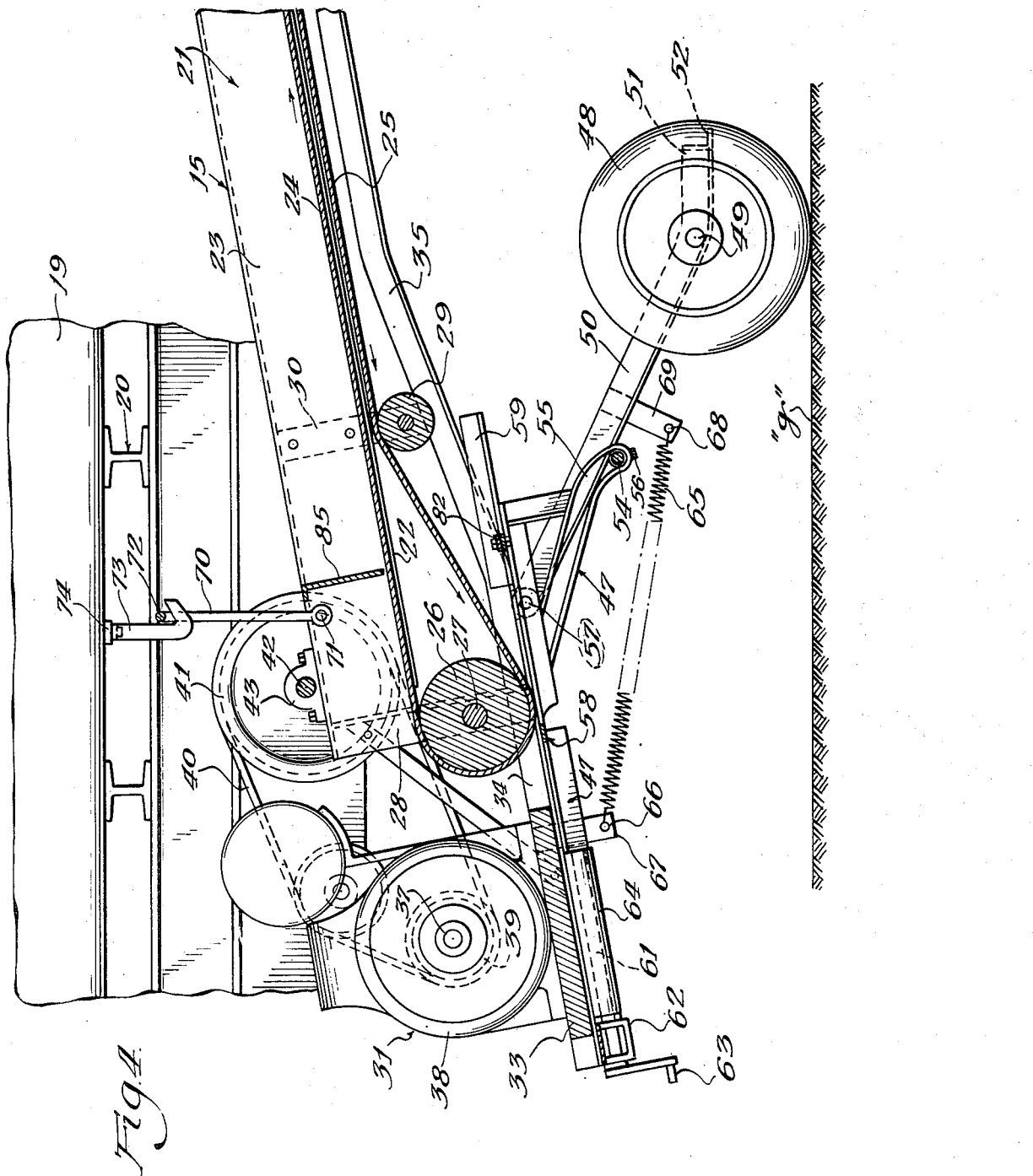

Nov. 27, 1945.     E. H. HELLER     2,389,779
COAL TRUCK UNLOADING DEVICE
Filed Nov. 17, 1944     9 Sheets-Sheet 5
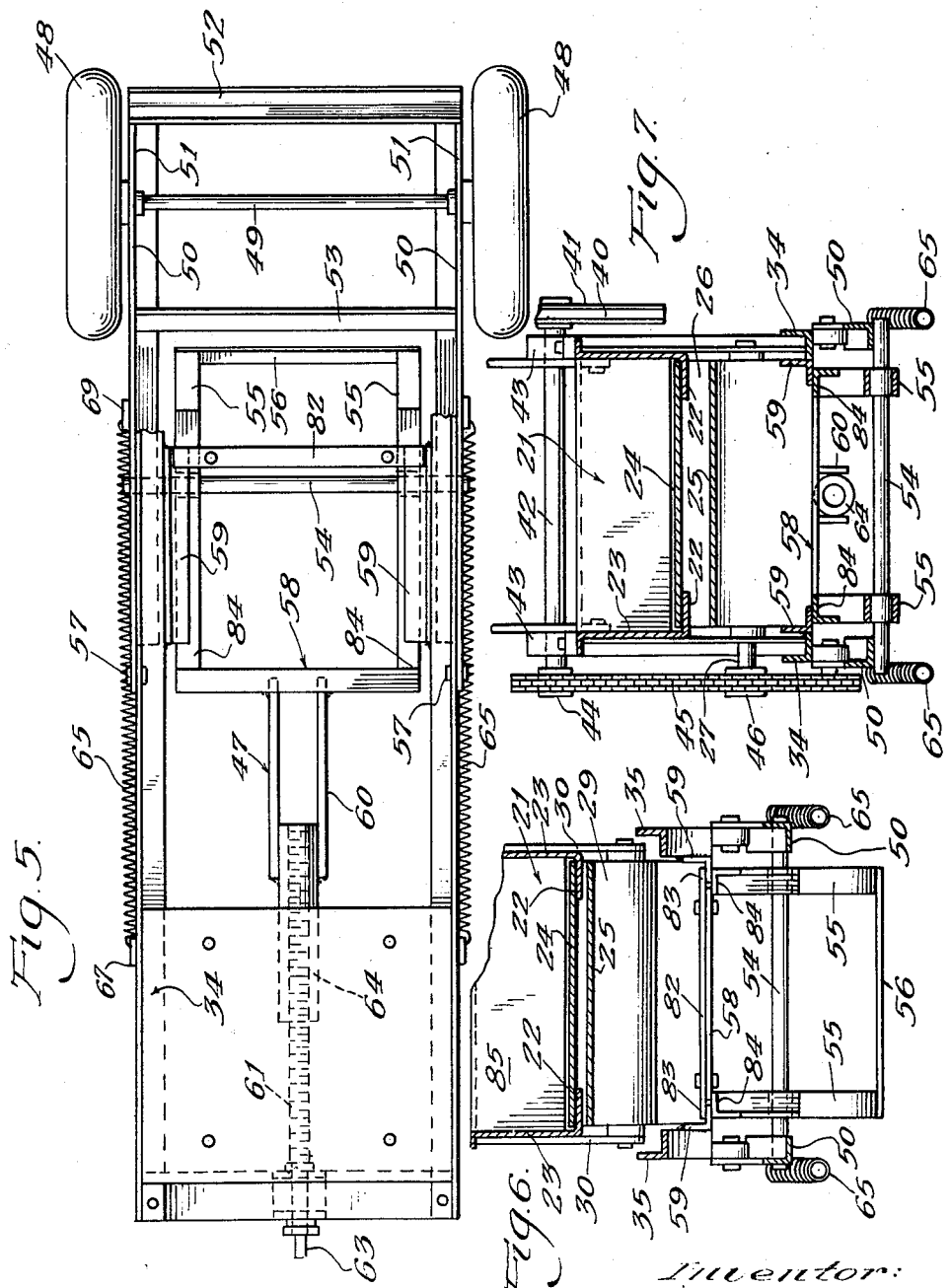

Nov. 27, 1945. E. H. HELLER 2,389,779
COAL TRUCK UNLOADING DEVICE
Filed Nov. 17, 1944 9 Sheets-Sheet 6

Inventor:
Eugene H. Heller
By Wallace and Cannow
Attorneys

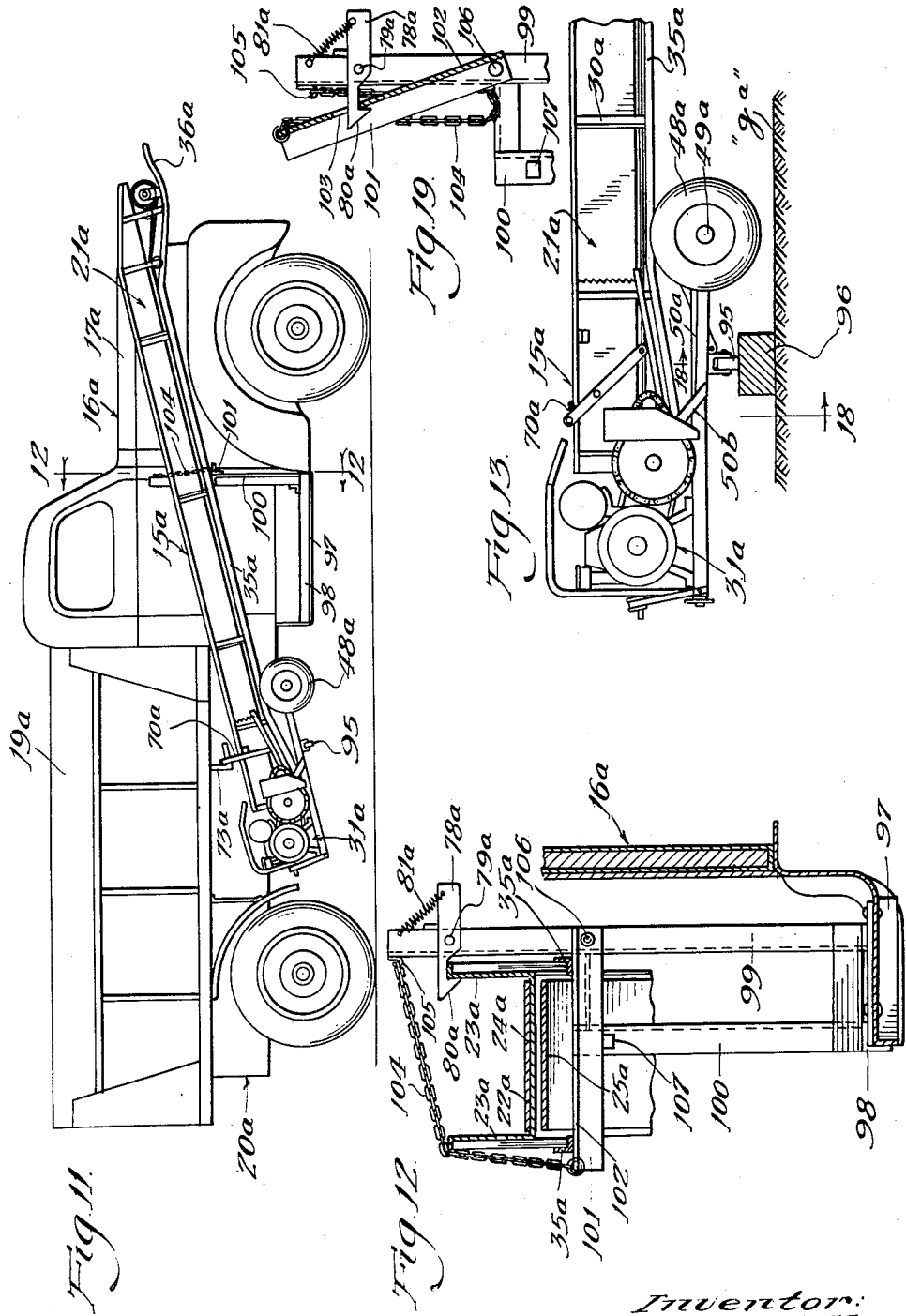

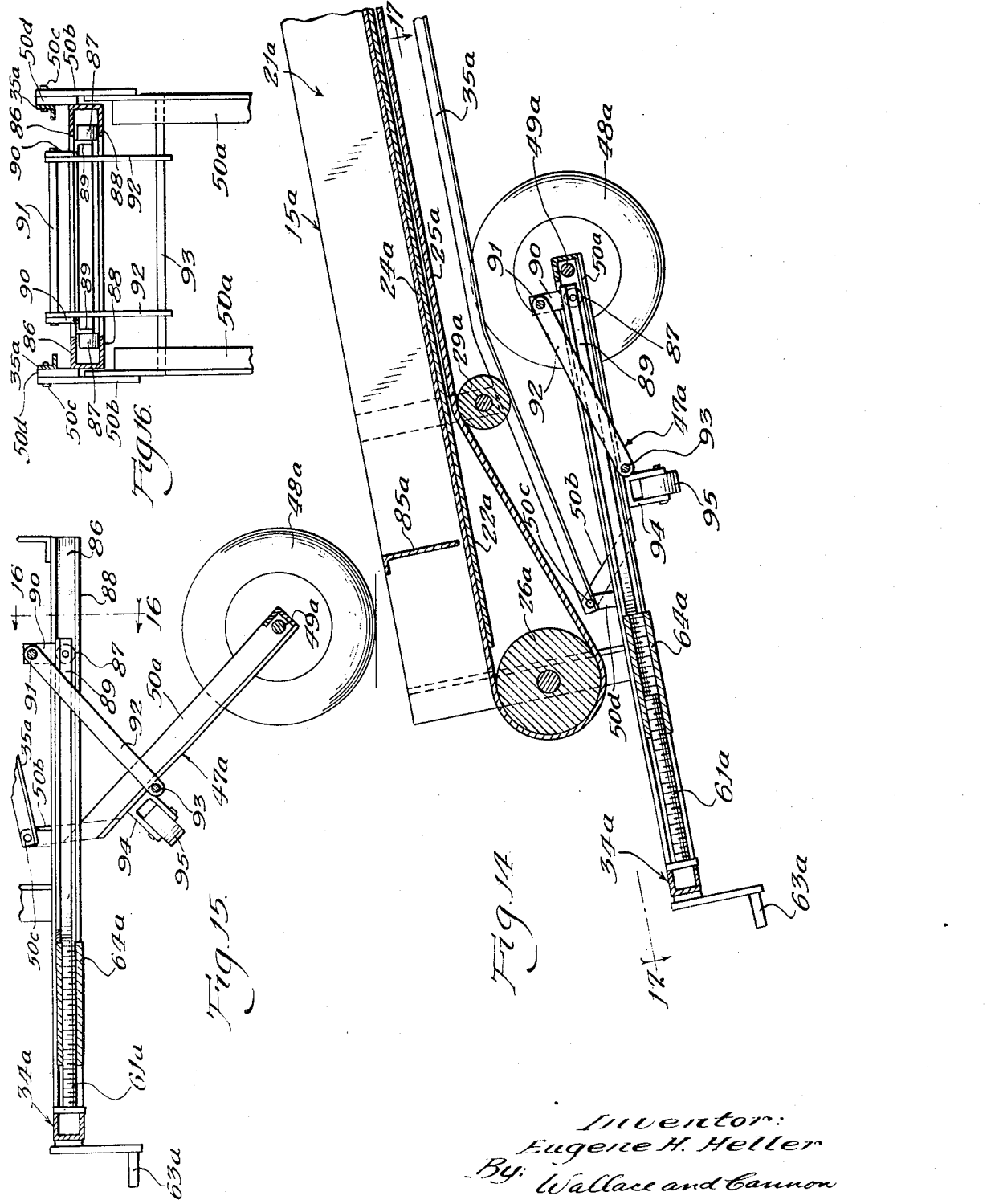

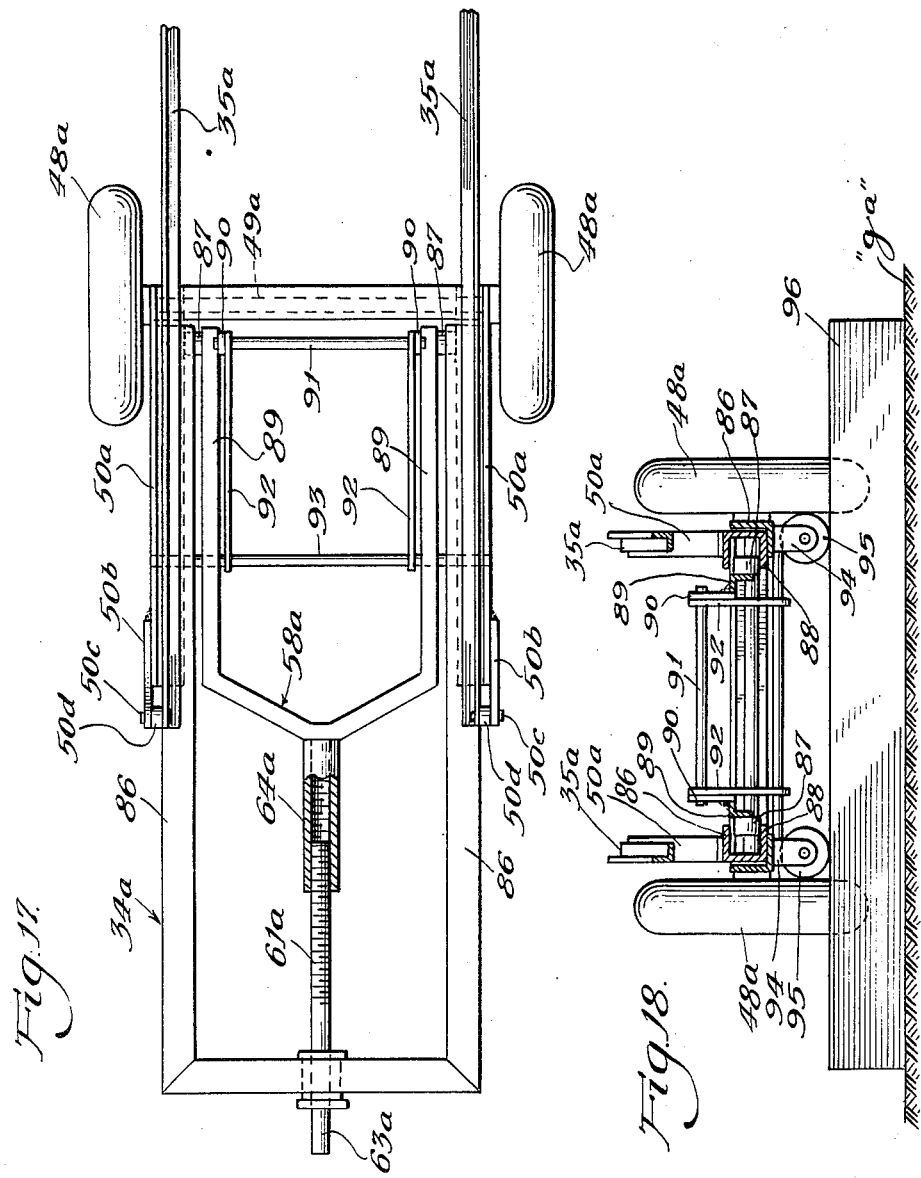

Patented Nov. 27, 1945

2,389,779

UNITED STATES PATENT OFFICE 2,389,779

COAL TRUCK UNLOADING DEVICE

Eugene H. Heller, Arlington Heights, Ill.

Application November 17, 1944, Serial No. 563,817

19 Claims. (Cl. 224—29)

This invention relates to a coal truck unloading device. More specifically, this invention relates to a coal truck unloading device which may be transported upon an automotive vehicle coal delivery truck for unloading coal from the truck at the point of delivery and delivering it into the basement of a house or other building or like place.

Coal truck unloading devices have been used heretofore in connection with or upon automotive vehicle coal delivery trucks but such prior coal unloading devices have been subject to a number of shortcomings and objectionable characteristics and among which have been the following: In general such prior coal truck unloading devices have had to be of such light design and construction as would enable them to be unloaded from and loaded back onto a coal truck in such a manner that the entire weight of the device, including the conveyor and coal chute embodied therein could be handled or borne by two men. This limitation has resulted in such coal truck unloading devices being of such light design and construction that they have lacked adequate structural strength and power to enable them to be used for unloading large loads of coal quickly and for prolonged periods of heavy use.

Accordingly, an object of the present invention is to provide a new and improved coal truck unloading device embodying a strong, durable heavy design and construction which enables it to be used for unloading heavy loads of coal and to be used for long periods of heavy use while, at the same time, the new coal truck unloading device is so designed and constructed that it may readily be unloaded from a coal truck and maneuvered into truck-unloading and coal-conveying position at the rear of the truck by only one person and then, after the completion of the coal-unloading and conveying operations, it may readily be remounted upon the truck by only one person and without heavy lifting to be transported for further use.

Another object of the invention is to provide in the new coal truck unloading device a novel wheel-bearing unit for supporting the coal-receiving end portion of the conveyor and the power unit and transmission mechanism for operating the conveyor.

A further object of the invention is to provide a novel manually operable mechanism for moving the wheel-bearing carriage into lowered or effective and supporting position so that the light or discharge end of the conveyor unit may be readily lifted off from a coal truck by only one person by employing the wheel-bearing carriage of the new coal-unloading device as a supporting pivot therefor and to the end that after the coal-unloading device has thus been unloaded from the truck it may be moved or wheeled by only one person into position at the rear of the truck and easily adjusted to complete the coal-unloading and conveying operations.

An additional object of the invention is to construct and arrange the wheel-bearing carriage and the manually controlled lowering and raising unit therefor in such a manner that after the completion of the truck-unloading operation the entire coal-unloading device may be wheeled into position at one side of the truck, the relatively heavy power-unit end of the new coal-unloading device secured in carrying or transporting position upon the truck, the light or discharge end of the conveyor then mounted in carrying or transporting position upon the truck, and the wheel-bearing carriage of the conveyor then manipulated into raised position below the coal-receiving end portion of the conveyor, all by only one man or boy and without any undue or heavy lifting.

It sometimes becomes necessary to move the relatively heavy new coal truck unloading device sidewise or transversely relative to its long axis in a narrow area in which this cannot be done by manipulating the device upon its main retractable supporting wheels. Accordingly, in one form of the present invention I have provided an arrangement whereby the new coal truck unloading device may be shifted or moved laterally by retracting its main retractable supporting wheels and then moving the device transversely relative to its main or long axis upon a pair of caster wheels or rollers which are mounted upon the supporting arms for the retractable supporting wheels and which caster wheels or rollers are adapted to roll upon suitable blocking or planks or the like disposed upon the ground to provide a raised supporting surface therefor. To provide this arrangement is another object of the invention.

Other and further objects of the present invention will be apparent from the following description and claims and are illustrated in the accompanying drawings which, by way of illustration, show preferred embodiments and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

Fig. 2 is an elevational view showing the new coal truck unloading device in the position which it occupies when removed from the coal truck and arranged in position of use to receive the coal discharged from the dump body of the truck and to convey it into the basement of a house or other building;

Figure 8:
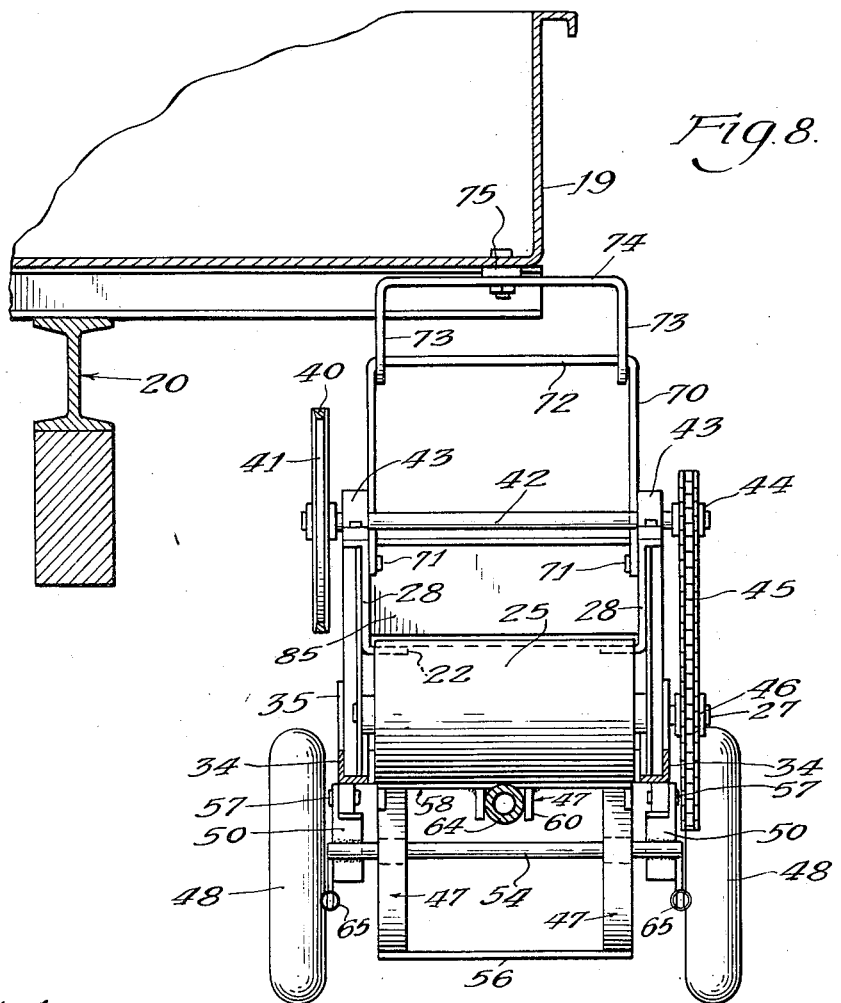
Figure 9:
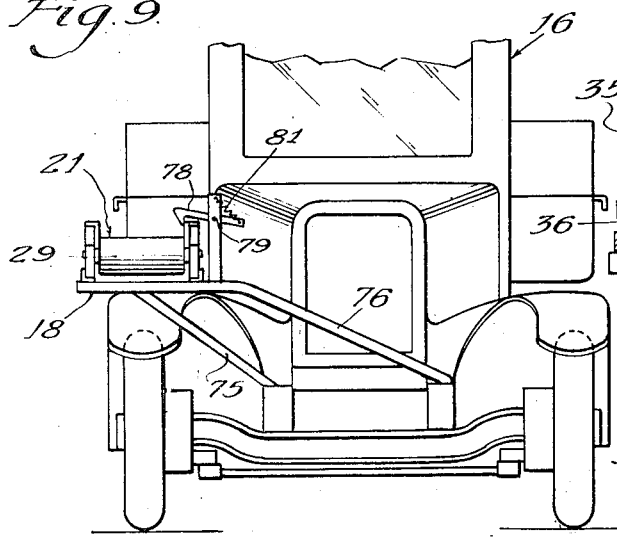
Figure 10:
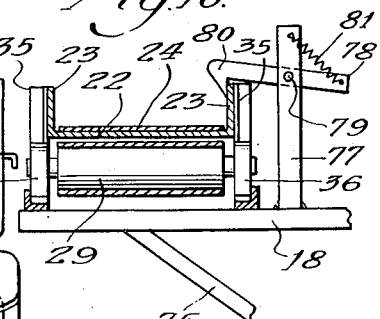

Fig. 3 is a fragmentary enlarged view, partly in section and partly in elevation, showing the manually operated raising and lowering mechanism for the wheel-bearing carriage of the new coal truck unloading device and the arrangement of the power unit and the power transmission mechanism for operating the conveyor, the wheel-bearing carriage of the new coal truck unloading device being shown in raised or retracted position;

Fig. 4 is a view of the parts illustrated in Fig. 3 but showing the wheel-bearing carriage of the coal truck unloading device in lowered position, that is to say, in the position which the parts occupy when the coal unloading device is ready to be removed from its position upon a coal truck as well as the position which it occupies when it is being remounted upon the truck;

Fig. 5 is a top plan view, on line 5—5 in Fig. 3, of the manually operated raising and lowering mechanism for the wheel-bearing carriage of the new coal truck unloading device;

Fig. 6 is a view on line 6—6 in Fig. 3, partly in section and partly in elevation;

Fig. 7 is a view on line 7—7 in Fig. 3, partly in section and partly in elevation;

Fig. 8 is a view on line 8—8 in Fig. 3, partly in section and partly in elevation, showing the manner in which the heavy or coal-receiving and power unit end of the new coal truck unloading device is mounted or suspended upon the body of the truck; and showing the arrangement of the parts embodied in the transmission mechanism for operating the conveyor;

Fig. 9 is a fragmentary front elevational view of a coal truck and of the discharge end of the conveyor and illustrating the manner in which said discharge end of the conveyor is mounted in carrying position upon and is retained in carrying position upon the truck;

Fig. 10 is an enlarged sectional detail view of the discharge end position of the conveyor and illustrates the means employed for retaining or latching said discharge end portion of the conveyor in carrying position upon the truck;

Fig. 11 is a side elevational view of a coal truck showing a modified form of the invention mounted thereon;

Fig. 12 is an enlarged vertical sectional view, on line 12—12 in Fig. 11, showing a modified construction for mounting the new coal truck unloading device upon the body of a coal truck;

Fig. 13 is a fragmentary side elevational view showing the modified form of the new coal truck unloading device with the main retractable supporting wheels retracted and the coal truck unloading device arranged to be rolled laterally or transversely relative to its main or long axis upon a pair of small caster wheels or rollers which are adapted to ride upon suitable blocking or planking arranged upon the ground to provide a raised supporting surface for said small caster wheels or rollers;

Fig. 14 is a fragmentary view, partly in section and partly in elevation, showing a modified construction for raising and lowering the retractable supporting wheels of the new coal truck unloading device, and showing said retractable supporting wheels in raised or retracted position;

Fig. 15 is a fragmentary view, partly in section and partly in elevation, illustrating the modified form of construction shown in Figs. 11 to 14, inclusive, with the main supporting wheels in lowered or supporting position;

Fig. 16 is a transverse sectional view on line 16—16 in Fig. 15;

Fig. 17 is a top plan view on line 17—17 in Fig. 14 illustrating the modified form of construction for raising and lowering the main retractable supporting wheels;

Fig. 18 is an enlarged view on line 18—18 in Fig. 13, partly in section and partly in elevation, illustrating the manner in which the relatively heavy new coal truck unloading device is moved sidewise or transversely relative to its long axis upon a pair of small caster wheels or rollers mounted upon the supporting arms for the main retractable supporting wheels; and Fig. 19 is a detail view, partly in section and partly in elevation, showing the manner in which the pivotally mounted supporting arm for the conveyor chute embodied in the form of the invention shown in Figs. 1 to 19, inclusive, may be latched in raised and ineffective position when not in use.

A preferred embodiment of the new coal truck unloading device is shown in Figs. 1 to 10, inclusive, of the drawings, is therein generally indicated at 15, and is shown mounted in carrying position upon an automotive vehicle coal truck 16 which is of conventional design except insofar as is pointed out specifically hereinafter, said coal truck 16 comprising a body 17 including a right front fender 18, a coal-receiving dump body 19, and a supporting truck chassis or frame 20.

*Conveyor unit*

The form of the new coal truck unloading device which is shown in Figs. 1 to 10, inclusive, of the drawings, comprises a conveyor unit 21 which includes a substantially channel-shaped conveyor body having a pair of spaced parallel bottom flanges 22 (Fig. 7) and a pair of upright parallel side walls 23, all made of relatively heavy metal and design and construction so as to enable any and all types of commercial coal to be passed therethrough and so as to withstand prolonged and more or less constant severe use. The conveyor unit 21 also includes a flat flexible conveyor belt 24—25, the upper and outward run of the conveyor belt 24 working over the bottom 22 of the conveyor body (Figs. 3, 4, 5 and 7). At its inner turn the conveyor belt 24—25 works around and is driven by a power-operated drive cylinder or roll 26 which is carried by a drive shaft 27 rotatably journaled in a pair of supporting arms 28 which are attached to the conveyor body 22—23 at the inner end thereof (Figs. 3 and 4). Intermediate its ends and at its outer end the lower run 25 of the conveyor belt 24—25 is guided by idler rolls such as 29 which are journaled in supporting and reinforcing members 30 which are attached to the vertical side walls 23 of the conveyor body or chute 22—23. An apron guard 85 is mounted in and between the vertical side walls 23 of the conveyor body or chute 22—23, adjacent the inner or rear end thereof, to prevent coal which is being unloaded from the truck body 19 onto the conveyor from falling back off the upper run of the conveyor belt 24—25 into the power-operating and transmission unit therefor, and which will now be described.

*Power unit and transmission mechanism for the conveyor*

The power unit and transmission mechanism which are embodied in the conveyor unit 21, for operating the conveyor belt 24—25, are generally indicated at 31, and may take various forms within the scope and contemplation of the present invention and of the appended claims. However, the power unit and transmission mechanism shown in the drawings have been found by actual use to be highly satisfactory. Thus the power unit comprises a prime mover which may have the form of a 2.5 H. P. gasoline engine, which is generally indicated at 32. The engine 32 is mounted upon a supporting base or platform 33 and this supporting base or platform 33 is carried by a metal frame 34 which may be made of any suitable material such, for example, as angle iron.

In order that the conveyor unit 21 and the power and transmission unit 31, as described hereinafter, may all be constructed in and as one unit, the supporting frame 34 is rigidly interconnected with the conveyor unit 21 by means of a pair of elongated metal brace members or rods 35. These brace members or rods 35 extend lengthwise of the body of the conveyor chute 22—23, at the sides of and somewhat below the body of the conveyor chute 22—23, and are interconnected in any suitable manner to the braces 30 which are mounted upon the side walls 23 of the conveyor chute 22—23. At their front ends each of the brace rods 35 has a portion 36 which projects forwardly beyond the front or discharge end of the conveyor chute 22—23 and these portions 36 provide handles for lifting the relatively light front and discharge end portion of the new coal unloading and conveying device off from the coal truck 16, and for maneuvering the device into unloading and conveying position, as in Fig. 2, as well as for raising the relatively light front and discharge end of the device back into carrying or transporting position upon the front fender 18 of the truck 16.

The power and transmission unit 31 includes a power-driven shaft 37 which carries a flywheel 38 and a speed-reducing pulley 39 around which a flexible V-shaped or like power transmission belt 40 works. The power transmission belt 40 also works around a speed-reducing pulley 41 which is mounted upon one end portion of a horizontal shaft 42 which is journaled in bearings 43 which are mounted upon the rear or inner end portion of the conveyor body or chute 22—23 and its supporting frame 28. At its opposite end the horizontal shaft 42 carries a sprocket gear 44 (Fig. 8) and a sprocket chain 45 works around this sprocket gear 44 and over a second sprocket gear 46 which is carried by the drive shaft 27 for the drive roll or cylinder 26 for the conveyor belt 24—25.

It will thus be seen that when the prime mover or engine 32 is set in operation power will be transmitted therefrom by way of the power transmission unit, namely, the shaft 37, pulley 39, belt 40, pulley 41, shaft 42, sprocket chain 45, sprocket gear 46, shaft 27, and drive roll or cylinder 26 to the conveyor belt 24—25 so as to operate the conveyor belt and thus convey coal from the point where the coal is discharged from the dump body 19 of the truck 16 into the conveyor chute 22—23, which is just to the right of the apron 85 as seen in Figs. 3 and 4, to the discharge end of the conveyor unit 31 (left hand end as seen in Fig. 2), and as will be described more fully hereinafter in connection with the description of the operation of the new coal truck unloading and conveying device.

*Raising and lowering mechanism for the wheel-bearing carriage in the form of construction shown in Figs. 1 to 10, inclusive*

The raising and lowering mechanism for the retractable wheel-bearing carriage of the new coal truck unloading and conveying device which is shown in Figs. 1 to 10, inclusive, will now be described and the same is generally indicated at 47 in the drawings, and is best shown in Figs. 3 and 4. It will be noted, in this connection, that the new coal truck unloading and conveying device includes a pair of relatively small and preferably rubber tired wheels 48 which are mounted upon a common axle 49. The axle 49 is journaled at its ends in a pair of spaced strong metallic angle iron or like supporting members 50, each of which has a front portion which is angled slightly with respect to the body of said member, (Figs. 3 and 4). The front end portions 51 of the members 50 are interconnected by a cross brace 52 and the members 50 are also interconnected between their ends by a second cross brace 53, (Fig. 5). The supporting members 50 are pivoted at their upper ends, as at 57 (Fig. 4), to a supporting frame 34 which carries the power and transmission unit 31, in a manner which will now be described.

A traveling carriage 58 is slidably mounted upon the supporting frame 34, and by reference to Figs. 5, 6 and 7 it will be noted that the sliding carriage 58 includes a pair of metal slide rails 84 each of which is slidably guided below a stationary guide member 59, these guide members 59 being welded or otherwise rigidly secured to the supporting frame 34.

As shown in Figs. 5, 6 and 7 each of the slide rails 84 carries a curved or arcuate shaped cam track 55. These cam tracks are interconnected adjacent their front and lower ends by a cross brace 56 and intermediate their front and rear ends the slide rails 84 are interconnected by a cross brace 82 (Figs. 5 and 6). This cross brace 82 has outer end portions 83 which are slidably mounted upon the horizontal flanges of the guide rails 59 of the supporting frame 34.

Extending between and carried by the two side members 50 of the wheel-bearing carriage 50—51—49—52—53 is a cylindrical cam rod or cam roller 54 and this cam rod or cam roller 54 projects through and works in the pair of curved or arcuate-shaped cam tracks 55, (Figs. 5 and 6).

The wheel raising and lowering device also includes a manually operable screw 61 which is rotatably mounted, as at 62, upon the supporting frame 34, the inner or rear end portion of this screw 61 having a manually operable crank 63 mounted thereon. The axially inner end portion of the screw 61 is screw threaded into a threaded sleeve 64 and this sleeve 64 is carried by a pair of parallel supporting arms 60 which are attached to the slidable frame 58 (Fig. 5).

Movement of the wheel-bearing carriage 50—49—48 into lowered position is facilitated by a pair of coil springs 65. One end portion of each coil spring 65 attached, as at 66, to a supporting arm carried by and depending from the supporting frame 34 and the other end portion of each spring 65 is attached, as at 68, to a supporting arm 69. The supporting arms 69 are mounted on and carried by the wheel-bearing members 50 (Fig. 3).

By reference to Figs. 3 and 4 and 8 it will be noted that the arms of a U-shaped supporting arm or bale 70 are pivotally attached at their lower ends, as at 71, upon the side walls 23 of the conveyor unit 21. The bight portion 72 of the U-shaped bale or supporting member 70 is releasably held or supported by a pair of hook-shaped arms 73 which are formed as a part of a supporting bracket or hanger 74. This bracket or hanger 74 may be swivelly attached, as at 75, to the bottom of the dump body 19 or to the frame of the truck 16 (Fig. 8), as desired.

As shown in Figs. 9 and 10, the front end portion of the right front fender of the coal truck 16, in addition to such conventional mounting or support as it may have, is further supported by a pair of supporting braces 75 and 76. Mounted upon the said right front fender 18 (Figs. 9 and 10) is an upright support 77 and pivotally mounted between its ends upon the support 77, as at 79, is a latch dog 78. This latch dog 78 has a hooked latching end portion 80 which is adapted to latchingly engage over or under one side wall 23 of the conveyor body or chute so as to retain the relatively light and discharge front end portion of the conveyor unit 21 in carrying position upon the body of the coal truck 16. The latch dog 78 is urged into such latching or effective position by means of a spring 81, one end portion of which spring 81 is attached to the latch dog 78 and the other end portion of which is attached to the supporting post 77 (Fig. 10).

*Operation of the form of construction shown in Figs. 1 to 10, inclusive*

Figure 1:
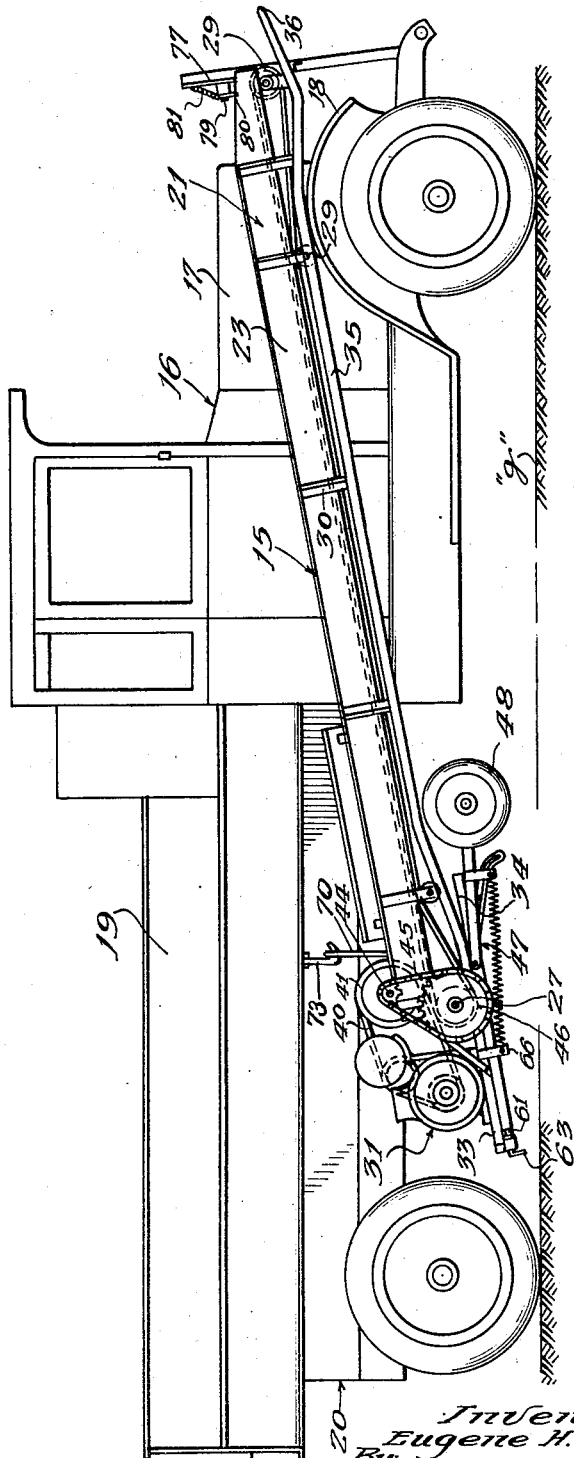
Fig. 1 is a view, partly in section and partly in elevation, showing the new coal truck unloading device in the position which it occupies when mounted upon a coal truck for transportation therewith.

The operation and use of the form of the new coal truck unloading device shown in Figs. 1 to 10, inclusive as follows:

The device is shown in Fig. 1 of the drawings in the position in which it may be disposed upon an automotive vehicle coal truck 16 for transportation from a coal loading positon, such as a coal yard, to a coal unloading position such as a customer's residence or other building. By reference to Fig. 1 it will also be noted that the device is retained in carrying position upon the coal truck 16 by the engagement of the U-shaped supporting member 70 with the hook shaped supporting element 72 and by the latching engagement of the latch dog 78—80 with one side wall 23 of the coal chute, as shown in Figs. 9 and 10 of the drawings.

However, when the coal truck 16 and the new coal unloading device 15 carried thereby arrive at a coal unloading position, such as a customer's residence or other place, the new coal handling device 15 may be unlatched from the truck 16 and moved into position, as shown in Fig. 2, at the rear of the truck, and at any desired angle relative to the long axis of the truck, for receiving the coal discharged from the dump body 19 of the coal truck and for conveying the same through an opening O such as a window or the like, in a building B, and into the basement or other coal storage space therein. This is accomplished as follows: The manually operable crank 63 is rotated so as to rotate the screw 61, and this retracts the sliding carriage 58, and the curved cam tracks 55 carried thereby, and the guide rails 84 thereon, along and relative to the guide rails 59 on the supporting frame 34 from right to left as seen in Figs. 1 and 3. During this movement of the sliding carriage 58 and its curved cam tracks 55 the outer end portion 83 of the cross brace 82 of the sliding carriage 58 slides over the horizontal flanges of the guide rails 59 on the supporting frame 34 and the guide rails 84 on the sliding carriage 58 slide under the horizontal flanges of the guide rails 59, as best shown in Figs. 6 and 7. This rearward movement of the sliding carriage and its curved cam tracks 55, relative to the cam member or cam rod 54 which works therein, causes the retractable wheel-bearing carriage 50—49—51, and the supporting wheels 48 carried thereby, to pivot at 57, upon and relative to the supporting frame 34, from their raised or retracted position, as shown in Figs. 1 and 3, into their lowered and effective or supporting position, as shown in Fig. 4. This movement of the retractable wheel-bearing carriage 50—49—51 upon and relative to the supporting frame 34 and the movement of the wheel-bearing carriage 50—49—51 and the supporting wheels 48 carried thereby into a lowered position is facilitated by the urging action of the springs 65.

When the supporting wheels 48 are thus lowered into supporting position, and in contact with the ground or like supporting surface G, (Fig. 4), a single truck operator unassisted may then manually remove the new coal handling device from the coal truck 16 by merely releasing the latch dog 78—80 from latching engagement with the inner side wall 23 of the coal chute 22—23, and then by grasping the handle portions 36 at the front or discharge end of the conveyor unit 21 about the supporting wheels 48 as a pivot, release the bight portion 72 of the pivotally mounted U-shaped supporting member 70 from detachable latching engagement with the hook-shaped supporting arms 73 of the swivelly mounted member 74. In this manner the new coal truck unloading device may readily be detached from the truck 16 without any undue or heavy lifting and by a single person.

It will be noted, in this connection, that this operation may be carried out by a single operator of the truck 16 unassisted by reason of the fact that the larger portion of the weight of the new coal handling device is supported by the wheels 48 and in order to release the member 70—72 from engagement with the supporting member 73—74 the operation of lifting the heavy end portion of the device is accomplished by merely depressing the relatively lighter and discharge end portion of the conveyor unit 21 about the supporting wheels 48 as a pivot or fulcrum. Hence it is possible for the device to be unloaded from the truck 16 by only one person, namely, the operator or driver of the truck 16, thus effecting an economy in labor.

After the new coal truck unloading device 15 has thus been unloaded from the coal truck 16 it may readily be put into coal-receiving and coal-conveying position at the rear of the truck, as shown in Fig. 2 of the drawings. This may readily be accomplished by merely grasping the handle elements 36 at the relatively light or discharge end of the conveyor unit 21 and then pushing, that is, wheeling the new coal handling device 15 into proper position, as in Fig. 2, with the discharge end portion of the conveyor unit 21 projecting into or through a coal-receiving opening O in the wall of a building B (Fig. 2).

With the new coal handling device thus properly positioned, as in Fig. 2, the power unit or motor 32 may be set in operation, whereupon power will be transmitted by way of the power transmission mechanism 39—40—41—42—44—45—46—27—26 to the flexible endless conveyor belt 24—25, which will then be operated in the direction of the arrows shown in Fig. 4, so as to convey the coal received from the dump body 19 of the coal truck 16 into the coal storage space in the building B.

During this operation the coal is discharged from the dump body 19 of the coal truck 16 into the channel-shaped coal chute 22—23 just forwardly of the apron 85 which prevents the coal from falling back into the power unit and power transmission device.

It will also be noted by a reference to Fig. 7 of the drawings, that during the coal conveying operation the upper run 24 of the conveyor belt 24—25 is supported by the bottom flanges 22 of the coal chute 23—22, so that the conveyor belt 24—25 is thus enabled to carry a relatively heavy load of coal which may be any one of various sizes and grades of commercial coal.

It will also be noted that during the coal unloading and conveying operations the weight of the conveyor unit 21 and of the coal being conveyed thereby, is supported by the elongated bracing members 35 which are welded or otherwise integrally attached to the supporting frame 34 for the power unit and transmission devices. This materially strengthens the conveyor unit and gives it sufficient weight and strength to enable it to carry a relatively heavy load of coal and to withstand prolonged and severe usage.

After the completion of the coal unloading and conveying operations the operation of the power unit 31 may be stopped, whereupon the discharge end portion of the conveyor unit 21 may be withdrawn from the opening O in the building wall B. By grasping the handle elements 36 the operator may then push, that is, wheel the new coal handling device 15 back into position for reloading it or remounting it onto the truck 16. This is accomplished by pushing that end of the device at which the power and transmission unit 31 is located under the dump body 19 of the truck 16, just forwardly of the rear wheels of the truck 16, and then engaging the bight portion 72 of the pivotally mounted U-shaped supporting member 70 over the depending hook-shaped arms 73 of the swivelly mounted supporting member 74. The relatively light discharge end portion of the conveyor unit 21 may then be raised into position over the front fender 18 of the truck 16 and latched in carrying position on the truck by engaging the hook-shaped end portion 80 of the latch dog 78 over the inner side wall 73 of the coal chute 23—22.

During this operation of remounting the new coal handling device 15 back into carrying position on the coal truck 16 the supporting wheels 48 are disposed in their lowered and effective or supporting position, and in which position they carry the bulk of the load of the new coal handling device.

Hence it will be seen that the supporting wheels 48 act as a pivot or fulcrum located between the ends of the device, with the major portion of the coal chute and conveyor projecting beyond the supporting wheels, at one side of the said fulcrum, and providing an elongated lever arm for manipulating the said coal truck unloading device about the supporting wheels 48 as the fulcrum of a first class lever, so that the operation is not required to lift any significant part of the weight of the new coal handling device 15 when remounting the same in carrying position upon the truck 16. Thus the operator is enabled to manipulate the device with relatively great ease and facility not only when remounting it in position of use upon an automotive vehicle coal truck but also when removing it therefrom and when using it after removal from the truck.

After the coal handling device 15 has thus been reloaded or remounted in carrying position upon the truck 16 the retractable wheel-bearing carriage 50—49—51 may be raised into its retracted and ineffective position, as shown in Figs. 1 and 3. This is accomplished by manually rotating the crank 63 of the operating screw 61 in a direction opposite to that in which these parts are rotated to lower the wheel-bearing carriage. This operation of the crank 63 and the operating screw 61 causes the sliding carriage 58—82—83—84 and the curved cam tracks 55 carried thereby to slide along and relative to the guide rails 59 of the supporting frame 34 (from left to right as seen in Figs. 4 and 5). This movement of the sliding carriage 58—82—83—84 and its curved cam tracks 55 acts through the cam member or cam rod 54 to pivot the wheel-bearing carriage 50—49—51, at 57, relative to and upon the supporting frame 34, back into raised and ineffective position, as shown in Figs. 1 and 3, whereupon the new coal handling device 15 may be transported with and by the truck 16 for further operation.

A modified form of the new coal truck unloading device is shown in Figs. 11 to 19, inclusive, of the drawings, and those parts thereof which are similar to corresponding parts in the form of the invention shown in Figs. 1 to 10, inclusive, have been given similar reference numerals followed by the additional reference character "a." The modification of the invention, which is shown in Figs. 11 to 19, inclusive, is in general very similar in construction and operation to the form of the invention shown in Figs. 1 to 10, inclusive. Hence only those parts which are embodied in the form of the invention shown in Figs. 11 to 19, inclusive, and which differ from or are in addition to parts embodied in the form of the invention shown in Figs. 1 to 10, inclusive, will be described in detail herein.

In the form of construction shown in Figs. 11 to 19, inclusive, the main supporting frame 34a includes a pair of channel-shaped side members and an anti-friction roller 87 is adapted to ride upon the lower horizontal flange 88 of each of the channel-shaped members 86 and within the channel afforded by the corresponding one of said channel-shaped members 86. The rollers 87 are rotatably mounted upon the side rails 89 of a slidable or traveling carriage 58a (Fig. 17) which corresponds, in general, to the traveling carriage 58 in the form of the invention which is shown in Figs. 1 to 10, inclusive. The carriage 58a includes a screw-threaded sleeve 64a in which a screw 61a works and this screw 61a carries a manually operable crank 63a which is arranged at one end of the supporting frame 34a (Fig. 17).

Mounted upon and fixed to the front end portion of each of the side rails 89 of the traveling or slidable carriage 34a is a short upright supporting bracket 90 (Figs. 15, 16 and 18). A horizontally extending tie or cross rod 91 has its end portions pivotally mounted or journaled in the upright brackets 90. A pair of links 92 have their upper end portions mounted on the tie or cross rod 91 and the lower end portions of these links 92 are pivotally mounted upon a supporting rod 93. This rod 93 has its end portions fixed, as by welding, to the under sides of the wheel-supporting arms 50a for the main retractable supporting wheels 48a of the form of the new coal truck unloading device shown in Figs. 11 to 19, inclusive. Each of the wheel-supporting arms 50a has an angularly extending part or member 50b secured to the upper end portion thereof, as by welding, and each of these angularly extending parts 50b of the wheel-supporting arms 50a is pivotally mounted, as at 50c, upon a short upstanding supporting or bearing bracket 50d, these brackets 50d being suitably attached to the side rails 86 of the main supporting frame 34a, as by welding, (Figs. 14, 15 and 16).

A U-shaped bearing bracket 94 is attached to the underside of each of the wheel-supporting arms 50a, in any suitable manner, as by welding, and a small caster wheel or roller 95 is journaled in each of these brackets 94. The caster wheels or rollers 95 are adapted to ride upon a suitable support, such as a block of wood 96 or the like, which is adapted to provide a raised supporting surface above the ground level Ga (Figs. 13 and 18) for a reason which will be explained hereinafter.

The relatively heavy power and transmission end of the form of the new coal truck unloading device shown in Figs. 11 to 19, inclusive, may be detachably mounted upon either the body or frame of the truck 16a—19a in the same manner described hereinbefore in connection with the form of the invention shown in Figs. 1 to 10, inclusive, and by means of corresponding parts 70a—73a, etc.

However, in the form of the invention shown in Figs. 11 to 19, inclusive, the parts shown in Figs. 9 and 10 for removably mounting the front end portion of the conveyor unit upon a coal truck have been modified and rearranged in the manner shown in Figs. 12 and 19 of the drawings and where these parts are shown as mounted upon one of the horizontal running boards 97 at the side of the truck 16a rather than upon the front fender thereof as in the form of the invention shown in Figs. 1 to 10, inclusive.

Thus, as shown in Fig. 12, a supporting base or plate 98 is upon one of the running boards 97 of the coal truck 16a—19a and a pair of upright supporting members 99 and 100 extend upwardly from this supporting base or plate 98 and may be formed as an integral casting therewith or otherwise, as desired. An L-shaped conveyor chute supporting member 101 has its inner end portion pivotally mounted, as at 106 (Fig. 19), upon the upper end portion of the upright supporting member 99 and when in lowered and horizontal conveyor chute supporting position the then horizontal arm 102 of this supporting member 101 rests upon and is supported by a supporting lug 107 which is mounted on the upper end portion of the upright supporting member 100 (Fig. 12).

A latch dog 78a—80a is pivotally mounted between its ends, as at 79a, upon the upper end portion of the upright supporting member 99 and is urged into effective or latching position, as in Fig. 12, by means of a spring 81a, one end of which is attached to the latch dog 78a and the other end of which is attached to the upper end portion of the upright supporting member 99.

A flexible retaining element, such as the chain 104, has one end portion attached to the outer end portion of the conveyor chute supporting arm 101 and the other end portion of the flexible element or chain 104 is adapted to be detachably attached to a hook 105 which is mounted upon the upper end portion of the upright supporting member 99 (Fig. 12).

A latch opening 103 (Fig. 19), is formed in the arm 102 of the conveyor chute supporting member 101 and when not in use this supporting member 101—102 may be latched in raised and ineffective position, as in Fig. 19, by projecting the latching end portion 80a of the latch dog 78a through the latch opening 103 in the arm 102 of the supporting member 101.

In the use of the form of the invention shown in Figs. 11 to 19, inclusive, the relatively heavy power unit and transmission end of the coal truck unloading device there shown may be mounted upon and suspended from the body or frame of the coal truck 16a—19a by means of the parts 70a—73a, as shown in Fig. 11, and in a manner which has been described hereinbefore in connection with the form of the invention shown in Figs. 1 to 10, inclusive.

However, in the form of the invention shown in Figs. 11 to 19, inclusive, the conveyor unit 22a—23a—24a—25a of the new coal truck unloading device is mounted upon, and its weight bears upon, the then horizontally extending supporting member 101—102 which is disposed in the position in which it is shown in Fig. 12. When so disposed the conveyor unit 22a—23a—24a—25a is securely latched in carrying position upon the coal truck by latching engagement of the latching end portion 80a of the spring-urged latch dog 78a with the inner side wall 23a of the conveyor chute, and the conveyor chute is further secured in carrying position by means of the flexible retaining element or chain 104 which, as shown in Fig. 12, extends upwardly over the outer side wall 23a of the conveyor chute and has its upper end attached to the hook 105 which is carried by the upper end portion of the upright supporting member 99.

When it is desired to remove the form of the new coal truck unloading device which is shown in Figs. 11 to 19, inclusive, from carrying position upon a coal truck this may readily be accomplished as follows: The retractable supporting wheels 48a may first be lowered into supporting position by manipulating the crank 63a and screw 61a relative to the screw threaded tubular sleeve 64a. This movement of the crank 63a and screw 61a causes the tubular sleeve 64a and attached slidable carriage or frame 58a to move relative to the main supporting frame 34a (right to left, Figs. 14 and 17). During this movement the rollers 87 ride upon the lower flanges 88 of the channel-shaped side rails 86 of the supporting frame 34a. This movement of the slidable carriage 58a and of the rollers 87 carried thereby in the channel-shaped side rails 86 of the frame 34a (right to left, Figs. 14 and 17) moves the links 92 rearwardly (right to left, Figs. 14 and 17) and by reason of the interconnection of the links 92 with the wheel-supporting arms 50a, through the cross rod 93, the links 92 are caused to pivot at their upper ends upon the cross rod or shaft 91. Hence since the lower end portions of the links 92 float upon the cross rod or shaft 93, which is fixed to the wheel-supporting arms 50a, and since the wheel-supporting arms 50a are pivotally mounted, as at 50c, upon the main supporting frame 34a, the rearward movement of the links 92 pivots the wheel-supporting arms 50a, and the supporting wheels 48a carried thereby downwardly upon their pivots 50c into lowered and supporting position, as in Fig. 15.

The free end portion of the flexible retaining element or chain 104 may then be detached from the hook 105 (Fig. 12) whereupon the hook-shaped end portion 80a of the latch dog 78a may then be moved, against the action of the spring 81a, out of latching engagement with the inner side wall 23a of the coal chute. The form of the new coal truck unloading device shown in Figs. 11 to 19, inclusive, may then be removed from carrying position on the coal truck by grasping the handles 36a (Fig. 11) and manipulating the device in the same manner as has been described in detail hereinbefore in connection with the form of the invention shown in Figs. 1 to 10, inclusive, and which need not, therefore, again be described.

After the form of the new coal truck unloading device has thus been removed from carrying position on a coal truck, the supporting member 101—102 may be pivoted, at 102, into raised and ineffective position, as shown in Fig. 19, and wherein it may be latched by engagement of the hooked-shaped end portion 80a of the latch 78a through and in the latch opening 103 which is formed in the arm 102 of the supporting member 101 which is thus latched in such a position that when not in use it is out of the way and in a non-obstructive and non-hazardous position. The free end portion of the flexible retaining element or chain 104 may then also be attached to the hook 105 so as to be out of the way when not in use.

The use of the form of the new coal truck unloading device which is shown in Figs. 11 to 19, inclusive, after the same has been removed from carrying position on a coal truck is substantially the same as have been described hereinbefore in connection with the form of the invention shown in Figs. 1 to 10, inclusive, and hence need not again be described.

However, the form of the new coal truck unloading device which is shown in Figs. 11 to 19, inclusive, embodies an additional feature which is not embodied in the form of the invention shown in Figs. 1 to 10, inclusive, namely the rollers 95 and their U-shaped supporting brackets or hangers 94 which are fixed to the wheel-supporting arms 50a, on the undersides of the latter, in such a position that the plane in which the rollers 95 move is transverse relative to the long axis of the supporting frame 34a.

Accordingly, in certain instances in which it may be desirable to move the form of the new coal truck unloading device shown in Figs. 11 to 19, inclusive, laterally or sidewise in a relatively narrow area or space in which this could not be done by manipulating the device upon its main supporting wheels 48a, such lateral or sidewise movement of the device may be accomplished as follows: The device being off from the truck, and with its main supporting wheels 48a resting upon the ground or like supporting surface, a block of wood 96 (Figs. 13 and 18) or suitable planks or the like may then be arranged upon the ground or like supporting surface Ga, so as to provide a raised surface thereabove with the block 96 or the like disposed under and extending transversely relative to the long axis of the form of the new coal truck unloading device which is shown in Figs. 11 to 19, inclusive, and in alignment with the caster wheels or rollers 95, as shown in Figs. 13 and 18. The main supporting wheels 48a may be retracted into raised and ineffective position by manipulating the crank 63a and screw 61a, in a direction opposite to that in which these parts are rotated to effect the lowering of the supporting wheels 48a. This movement of the crank 63a and attached screw 61a causes the threaded sleeve 64a and the traveling carriage 58a to move into the position in which the parts are shown in Figs. 14 and 17. During this operation the anti-friction rollers 87, which are carried by the traveling carriage 58a, travel forwardly upon the lower flanges 88 of the channel-shaped side rails 86 of the main supporting frame 34a. This forward movement of the traveling carriage 58a, and of the links 92 carried thereby, causes the links 92 to pivot at their upper and lower ends, as at 91 and 93, respectively, and by reason of the connection of the links 92 with the wheel-supporting arms 50a, through the cross rod or shaft 93, the wheel-supporting arms 50a are pivoted at 50c, (counterclockwise from the position shown in Fig. 15) and the wheel-supporting arms 50a and the supporting wheels 48a carried thereby are thus moved back into raised and retracted and ineffective position, as in Fig. 14. As the main supporting wheels 48a are thus moved into raised or retractable position, the small caster wheels or rollers 95, and the weight of the new coal truck unloading device carried thereby, are thus lowered down onto the upper surface of the supporting block 96 or the like. When the parts are thus disposed it will be noted, as shown in Fig. 13, that the then retracted main supporting wheels 48a are disposed above the ground or like supporting surface Ga.

The entire coal truck unloading device may then be moved sidewise or laterally by rolling the small caster wheels or rollers 95 over the upper surface of the block 96 or the like, the rollers or caster wheels 95 then rotating in their supporting hangers or brackets 94. In this manner the entire coal truck unloading device may be shifted or moved sidewise in a relatively small or narrow area or other space in which it would not be possible to manipulate into the desired or proper coal-unloading position by manipulating it upon its main supporting wheels 48a.

After the coal truck unloading device has been moved sidewise or laterally into the desired position (and back again if necessary) the main supporting wheels 48a may again be lowered into supporting position, as in Fig. 15, whereupon the relatively heavy end portion of the form of the new coal truck unloading device which is shown in Figs. 11 to 19, inclusive, of the drawings may be reattached in carrying position upon and suspended from the body or frame of the truck, by means of the parts 73a—70a, in the same manner as has been described hereinbefore in connection with the form of the invention shown in Figs. 1 to 10, inclusive. The hooked end portion 80a of the latch dog 78a may then be released from latching engagement in the latch opening 103 in the arm 102 of the supporting member 101 and the supporting member 101 lowered into horizontal position, as in Fig 12, in which it is supported by the bearing of its arm 102 on the upper end portion of the supporting member 100. The remounting of the device in carrying position upon a coal truck may then be completed by grasping the handles 36a and swinging the coal chute 21a up over the then horizontally extending supporting member 101—102, with the brace members or rods 35a resting thereon, engaging the hook-shaped end 80a of the latch dog 78a with the inner side wall 23a of the chute, attaching the free end portion of the flexible retaining element or chain 104 to the hook 105, and then manipulating the crank 63a and screw 61a so as to move the main supporting wheels 48a back into raised and retracted and ineffective position.

It will be noted that the construction of the new device is relatively heavy, strong and sturdy and when considered as a whole, that is, as a single unit, has such a strong and sturdy construction that its weight is far in excess of the weight which even two men might lift off and onto a coal truck if they were compelled to lift the entire weight of the new coal handling device 15 during the unloading and loading operations, that is to say, during both the operation of unloading the device 15 from the coal truck 16 and during the operation of reloading the device 15 back onto the coal truck 16.

However, as explained hereinbefore, the construction of the new device is such that it is not necessary for the single operator thereof to lift any appreciable or significant portion of the device during either the unloading or the loading operation since during both of such operations the wheel-bearing carriage 50—49—51 and the supporting wheels 48 carried thereby are employed as a pivot or fulcrum of a first class lever embodying an elongated operating lever arm, and with the fulcrum so positioned relative to the center of gravity of the device that it may be readily unloaded from and reloaded back onto the truck 16 without necessitating that the operator lift any appreciable portion thereof during either the unloading or the loading operation.

Hence by reason of the construction of the new coal handling device, as explained hereinbefore, it is possible to build the same of such relatively heavy materials and construction that it has been found to work satisfactorily over a considerable period of time in unloading thousands of tons of coal of all sizes and weights without material damage to or wear upon the device itself.

It will thus be seen from the foregoing description, considered in conjunction with the accompanying drawings, that the new coal truck unloading device accomplishes its intended objects, and has the desirable advantages and characteristics, including those hereinbefore pointed out and others which are inherent in the invention.

While I have hereinbefore referred to the new portable unloading device as being especially designed for use as a portable coal unloading device for use in conjunction with automotive vehicle coal trucks it will be understood that it may also be used as a portable unloading device for unloading other bulk materials such, for example, as coke, sand, gravel and the like from an automotive vehicle truck.

Hence, while I have illustrated and described the preferred embodiments of my invention, it is to be understood that these are capable of variation and modification and I therefore do not wish to be limited to the precise details set forth, but desire to avail myself of such changes and alterations as fall within the purview of the following claims.

I claim:

1. A device for unloading coal from automotive vehicle coal trucks and adapted to be transported by an automotive vehicle coal truck, said device comprising a supporting frame, a substantially channel-shaped coal chute having a coal-receiving end portion mounted upon the body of said supporting frame and having a coal-discharging end portion projecting beyond and remote from the body of said supporting frame, a flexible endless conveyor belt for conveying coal along said coal chute from the coal-receiving end portion to the coal-discharging end thereof, a power unit carried by the body of said supporting frame adjacent the said coal-receiving end portion of said coal chute, said device including power transmission means arranged adjacent the said coal-receiving end portion of said coal chute and operable by said power unit for driving said conveyor belt, a retractable wheel-bearing carriage arranged below the body of said supporting frame and pivotally connected thereto, a pair of supporting wheels mounted upon said wheel-bearing carriage below and intermediate the ends of said coal chute, means including a manually operable member carried by said supporting frame for pivoting the said wheel-bearing carriage and the said supporting wheels carried thereby relative to said supporting frame into lowered and effective position below said coal chute and between the ends thereof and for retracting the said wheel-bearing carriage and the said supporting wheels carried thereby relative to the said supporting frame into raised and retracted position below said coal chute and between the ends thereof, said supporting wheels when in lowered and effective position bearing the weight of said supporting frame and of said power unit and of said transmission means and of said coal chute and serving as a pivot or fulcrum upon which the relatively lighter and discharge end portion of said coal chute may be lifted off from carrying position on the body of an automotive vehicle coal truck and raised back into carrying position thereon, and means arranged adjacent the coal-receiving end portion of said coal chute for releasably attaching said device upon an automotive vehicle truck for transportation thereby, said attaching means including a supporting member adapted to be mounted upon an automotive vehicle coal truck and a supporting member mounted upon the said coal truck unloading device adjacent the coal receiving end portion thereof and detachably attachable to the said first-named supporting member and releasable from engagement therewith by lowering the said wheel-bearing supporting carriage and the said supporting wheels carried thereby into lowered and effective position and then depressing the discharge end portion of said coal chute about said supporting wheels as a pivot or fulcrum so as to raise the said coal-receiving end portion of said device and thus detach the said second-named supporting member from the said first-named supporting member.

2. A coal truck unloading device as defined in claim 1 which includes means for raising and lowering the said retractable wheel-bearing carriage relative to the said supporting frame including a traveling carriage slidably mounted upon the said supporting frame, means including a manually operable member carried by said supporting frame for slidably moving said traveling carriage upon and relative to said supporting frame, and means operatively interconnecting the said traveling carriage and the said retractable wheel-bearing carriage so that slidable movement of said traveling carriage upon and relative to said supporting frame is transmitted into pivoted lowering and raising or retracting movement of said wheel-bearing carriage upon and relative to the said supporting frame.

3. A coal truck unloading device as defined in claim 1 in which the said first-named supporting member is adapted to be swively mounted upon the body of automotive vehicle coal truck and in which the said second-named supporting member is pivotally mounted upon the said coal truck unloading device adjacent the coal-receiving end portion of said coal chute and is detachably attachable to said swively mounted supporting member so as to support the weight of the coal-receiving end portion of said coal chute and of said power unit and of said retractable wheel bearing carriage when the said coal truck unloading device is mounted in carrying but ineffective position upon an automotive vehicle coal truck.

4. A device for unloading coal from automotive vehicle coal trucks and adapted to be transported by an automotive vehicle coal truck, said device comprising a supporting frame, a substantially channel-shaped coal chute having a coal-receiving end portion mounted upon the body of said supporting frame and having a coal-discharging end portion projecting beyond and remote from the body of said supporting frame, a flexible endless conveyor belt for conveying coal along said coal chute from the coal-receiving end portion to the coal-discharging end thereof, a power unit carried by the body of said supporting frame adjacent the said coal-receiving end portion of said coal chute, said device including power transmission means arranged adjacent the said coal-receiving end portion of said coal chute and operable by said power unit for driving said conveyor belt, a retractable wheel-bearing carriage arranged below the body of said supporting frame and pivotally connected thereto, a pair of supporting wheels mounted upon said wheel-bearing carriage below and intermediate the ends of said coal chute, means including a manually operable member carried by said supporting frame for pivoting the said wheel-bearing carriage and the said supporting wheels carried thereby relative to said supporting frame into lowered and effective position below said coal chute and between the ends thereof and for retracting the said wheel-bearing carriage and the said supporting wheels carried thereby relative to the said supporting frame into raised and retracted position below said coal chute and between the ends thereof, said supporting wheels when in lowered and effective position bearing the weight of said supporting frame and of said power unit and of said transmission means and of said coal chute and serving as a pivot or fulcrum upon which the relatively lighter and discharge end portion of said coal chute may be lifted off from carrying position on the body of an automotive vehicle coal truck and raised back into carrying position thereon, said device including means for raising and lowering the said retractable wheel-bearing carriage relative to the said supporting frame including a traveling carriage slidably mounted upon the said supporting frame, means including a manually operable member carried by said supporting frame for slidably moving said traveling carriage upon and relative to said supporting frame, and means operatively interconnecting the said traveling carriage and the said retractable wheel-bearing carriage so that slidable movement of said traveling carriage upon and relative to said supporting frame is transmitted into pivoted lowering and raising or retracting movement of said wheel-bearing carriage upon and relative to the said supporting frame, the said means operatively interconnecting the said traveling carriage and the said retractable wheel-bearing carriage including a pair of spaced arcuate cam tracks rigidly attached to and depending from said traveling carriage and a cam rod carried by the said retractable wheel-bearing carriage and having end portions working in said cam tracks.

5. A portable device for unloading automotive vehicle coal trucks and constructed and arranged to be mounted upon and transported with an automotive vehicle coal truck from a coal-loading to a coal-unloading position, said device comprising a supporting frame, a conveyor unit including an elongated coal chute having a coal-receiving end portion mounted upon said supporting frame and having a coal-discharging end portion located at a point remote from said supporting frame, a conveyor belt for conveying coal along said coal chute from the coal-receiving end portion to the coal-discharging end portion thereof, a power unit carried by said supporting frame, power transmission means operable by said power unit for driving said flexible endless conveyor belt, a retractable wheel-bearing carriage pivotally mounted upon said supporting frame and including a pair of supporting wheels projecting forwardly of said power unit and transmission means and disposed intermediate the ends of said conveyor unit below the latter, means including a manually operable member carried by said supporting frame for pivotally lowering the said wheel-bearing carriage and the said supporting wheels carried thereby and for pivotally raising the said wheel-bearing carriage and the said supporting wheels carried thereby into raised and retracted or ineffective position, relative to the said supporting frame, and means arranged adjacent the coal-receiving end portion of said coal chute for releasably attaching said device upon an automotive vehicle truck for transportation thereby, said attaching means including a supporting member adapted to be mounted upon an automotive vehicle coal truck and a supporting member mounted upon the said coal truck unloading device adjacent the coal-receiving end portion thereof and detachably attachable to the said first-named supporting member and releasable from engagement therewith by lowering the said wheel-bearing supporting carriage and the said supporting wheels carried thereby into lowered and effective position and then depressing the discharge end portion of said coal chute about said supporting wheels as a pivot or fulcrum so as to raise the said coal-receiving end portion of said device and thus detach the said second-named supporting member from the said first-named supporting member.

6. A device as defined in claim 5 in which the second-named supporting member is in the form of a substantially U-shaped member having a pair of arms pivotally mounted at their lower ends upon said coal chute and in which the said U-shaped member includes a bight portion extending between said arms and adapted to be releasably engaged with the said supporting member mounted upon the truck when the said coal truck unloading device is in carrying but ineffective position upon said automotive vehicle coal truck.

7. A device as defined in claim 5 which includes a pair of elongated bracing member extending lengthwise of the body of said coal chute below the latter and having their rear end portions integrally attached to said supporting frame, and in which said elongated bracing members are attached intermediate their ends to the body of said coal chute so that said body of the coal chute is braced and supported thereby.

8. A portable device for unloading automotive vehicle coal trucks and constructed and arranged to be mounted upon and transported with an automotive vehicle coal truck from a coal-loading to a coal-unloading position, said device comprising a supporting frame, a conveyor unit including an elongated coal chute having a coal-receiving end portion mounted upon said supporting frame and having a coal-discharging end portion located at a point remote from said supporting frame, a conveyor belt for conveying coal along said coal chute from the coal-receiving end portion to the coal-discharging end portion thereof, a power unit carried by said conveyor unit for driving said flexible endless conveyor belt, a retractable wheel-bearing carriage pivotally mounted upon said supporting frame and including a pair of supporting wheels projecting forwardly of said power unit and transmission means and disposed intermediate the ends of said conveyor unit below the latter, means including a manually operable member carried by said supporting frame for pivotally lowering the said wheel-bearing carriage and the said supporting wheels carried thereby and for pivotally raising the said wheel-bearing carriage and the said supporting wheels carried thereby into raised and retracted or ineffective position, relative to the said supporting frame, means arranged between the said supporting wheels and the end of said device which is opposite the coal-discharging end thereof for attaching said device to and for suspending the coal-receiving end portion of said device and the weight of the parts arranged at the coal-receiving end of said device from an automotive vehicle coal truck when said supporting wheels are in raised and retracted and ineffective position, said device including a pair of elongated bracing members extending lengthwise of said coal chute below the latter and having their rear end portions attached to said supporting frame, said bracing members being attached intermediate their ends to said coal chute so as to brace the said coal chute, each of said bracing members having an extension projecting beyond the discharge end of said coal chute, said extensions providing handle elements for raising and lowering the said discharge end portion of said coal chute about the said supporting wheels as a pivot or fulcrum so as to lift the discharge end portion of said coal chute onto the body of an automotive vehicle coal truck and to lift the said discharge end portion of said coal chute off from the body of said coal truck when said supporting wheels are in lowered and effective or supporting position.

9. A device for unloading coal from automotive vehicle coal trucks and adapted to be transported by an automotive vehicle coal truck, said device comprising a supporting frame, a substantially channel-shaped coal chute having a coal-receiving end portion mounted upon the body of said supporting frame and having a coal-discharging end portion projecting beyond and remote from the body of said supporting frame, a flexible endless conveyor belt for conveying coal along said coal chute from the coal-receiving end portion to the coal-discharging end thereof, a power unit carried by the body of said supporting frame adjacent the said coal-receiving end portion of said coal chute, said device including power transmission means arranged adjacent the said coal-receiving end portion of said coal chute and operable by said power unit for driving said conveyor belt, a retractable wheel-bearing carriage arranged below the body of said supporting frame and pivotally connected thereto, a pair of supporting wheels mounted upon said wheel-bearing carriage below and intermediate the ends of said coal chute, means including a manually operable member carried by said supporting frame for pivoting the said wheel-bearing carriage and the said supporting wheels carried thereby relative to said supporting frame into lowered and effective position below said coal chute and between the ends thereof and for retracting the said wheel-bearing carriage and the said supporting wheels carried thereby relative to the said supporting frame into raised and retracted position below said coal chute and between the ends thereof, said supporting wheels when in lowered and effective position bearing the weight of said supporting frame and of said power unit and of said transmission means and of said coal chute and serving as a pivot or fulcrum upon which the relatively lighter and discharge end portion of said coal chute may be lifted off from carrying position on the body of an automotive vehicle coal truck and raised back into carrying position thereon, said device including means for raising and lowering the said retractable wheel-bearing carriage relative to the said supporting frame including a traveling carriage slidably mounted upon the said supporting frame, means including a manually operable member carried by said supporting frame for slidably moving said traveling carriage upon and relative to said supporting frame, and means operatively interconnecting the said traveling carriage and the said retractable wheel-bearing carriage so that slidable movement of said traveling carriage upon and relative to said supporting frame is transmitted into pivoted lowering and raising or retracting movement of said wheel-bearing carriage upon and relative to the said supporting frame, said supporting frame including a pair of substantially channel-shaped side rails each including a lower flange portion and said traveling carriage including an antifriction device bearing upon and movable along each of the said lower flange portions of the said substantially channel-shaped side rails of the said supporting frame.

10. A device for unloading coal from automotive vehicle coal trucks and adapted to be transported by an automotive vehicle coal truck, said device comprising a supporting frame, a substantially channel-shaped coal chute having a coal-receiving end portion mounted upon the body of said supporting frame and having a coal-discharging end portion projecting beyond and remote from the body of said supporting frame, a flexible endless conveyor belt for conveying coal along said coal chute from the coal-receiving end portion to the coal-discharging end thereof, a power unit carried by the body of said supporting frame adjacent the said coal-receiving end portion of said coal chute, said device including power transmission means arranged adjacent the said coal-receiving end portion of said coal chute and operable by said power unit for driving said conveyor belt, a retractable wheel-bearing carriage arranged below the body of said supporting frame and pivotally connected thereto, a pair of supporting wheels mounted upon said wheel-bearing carriage below and intermediate the ends of said coal chute, means including a manually operable member carried by said supporting frame for pivoting the said wheel-bearing carriage and the said supporting wheels carried thereby relative to said supporting frame into lowered and effective position below said coal chute and between the ends thereof and for retracting the said wheel-bearing carriage and the said supporting wheels carried thereby relative to the said supporting frame into raised and retracted position below said coal chute and between the ends thereof, said supporting wheels when in lowered and effective position bearing the weight of said supporting frame and of said power unit and of said transmission means and of said coal chute and serving as a pivot or fulcrum upon which the relatively lighter and discharge end portion of said coal chute may be lifted off from carrying position on the body of an automotive vehicle coal truck and raised back into carrying position thereon, said device including means for raising and lowering the said retractable wheel-bearing carriage relative to the said supporting frame including a traveling carriage slidably mounted upon the said supporting frame, means including a manually operable member carried by said supporting frame for slidably moving said traveling carriage upon and relative to said supporting frame, and means operatively interconnecting the said traveling carriage and the said retractable wheel-bearing carriage so that slidable movement of said traveling carriage upon and relative to said supporting frame is transmitted into pivoted lowering and raising or retracting movement of said wheel-bearing carriage upon and relative to the said supporting frame, and the said means for operatively interconnecting the said traveling carriage and the said retractable wheel-bearing carriage so that slidable movement of said traveling carriage upon and relative to said supporting frame is transmitted into pivoted lowering and raising or retracting movement of said wheel-bearing carriage upon and relative to the said supporting frame, and the said means for operatively interconnecting the said traveling carriage and the said retractable wheel-bearing carriage including a link mechanism having one end pivotally connected to the said traveling carriage and having its other end pivotally connected to the said wheel-bearing carriage below the said supporting frame.

11. A device for unloading coal from automotive vehicle coal trucks and adapted to be transported by an automotive vehicle coal truck, said device comprising a supporting frame, a substantially channel-shaped coal chute having a coal-receiving end portion mounted upon the body of said supporting frame and having a coal-discharging end portion projecting beyond and remote from the body of said supporting frame, a flexible endless conveyor belt for conveying coal along said coal chute from the coal-receiving end portion to the coal-discharging end thereof, a power unit carried by the body of said supporting frame adjacent the said coal-receiving end portion of said coal chute, said device including power transmission means arranged adjacent the said coal-receiving end portion of said coal chute and operable by said power unit for driving said conveyor belt, a retractable wheel-bearing carriage arranged below the body of said supporting frame and pivotally connected thereto, a pair of supporting wheels mounted upon said wheel-bearing carriage below and intermediate the ends of said coal chute, means including a manually operable member carried by said supporting frame for pivoting the said wheel-bearing carriage and the said supporting wheels carried thereby relative to said supporting frame into lowered and effective position below said coal chute and between the ends thereof and for retracting the said wheel-bearing carriage and the said supporting wheels carried thereby relative to the said supporting frame into raised and retracted position below said coal chute and between the ends thereof, said supporting wheels when in lowered and effective position bearing the weight of said supporting frame and of said power unit and of said transmission means and of said coal chute and serving as a pivot or fulcrum upon which the relatively lighter and discharge end portion of said coal chute may be lifted off from carrying position on the body of an automotive vehicle coal truck and raised back into carrying position thereon, said device including means for raising and lowering the said retractable wheel-bearing carriage relative to the said supporting frame including a traveling carriage slidably mounted upon the said supporting frame, means including a manually operable member carried by said supporting frame for slidably moving said traveling carriage upon and relative to said supporting frame, and means operatively interconnecting the said traveling carriage and the said retractable wheel-bearing carriage so that slidable movement of said traveling carriage upon and relative to said supporting frame is transmitted into pivoted lowering and raising or retracting movement of said wheel-bearing carriage upon and relative to the said supporting frame, and the said retractable wheel-bearing carriage having mounted thereon at the underside thereof rotatable means upon which the said coal truck unloading device may be moved in a direction transverse relative to its long axis after the said coal truck unloading device has been removed from carrying position upon a coal truck and the said retractable wheel-bearing carriage and the said supporting wheels carried thereby have been moved into raised or retracted and ineffective position.

12. A device for unloading coal from automotive vehicle coal trucks and adapted to be transported by an automotive vehicle coal truck, said device comprising a supporting frame, a substantially channel-shaped coal chute having a coal-receiving end portion mounted upon the body of said supporting frame and having a coal-discharging end portion projecting beyond and remote from the body of said supporting frame, a flexible endless conveyor belt for conveying coal along said coal chute from the coal-receiving end portion to the coal-discharging end thereof, a power unit carried by the body of said supporting frame adjacent the said coal-receiving end portion of said coal chute, said device including power transmission means arranged adjacent the said coal-receiving end portion of said coal chute and operable by said power unit for driving said conveyor belt, a retractable wheel-bearing carriage arranged below the body of said supporting frame and pivotally connected thereto, a pair of supporting wheels mounted upon said wheel-bearing carriage below and intermediate the ends of said coal chute, means including a manually operable member carried by said supporting frame for pivoting the said wheel-bearing carriage and the said supporting wheels carried thereby relative to said supporting frame into lowered and effective position below said coal chute and between the ends thereof and for retracting the said wheel-bearing carriage and the said supporting wheels carried thereby relative to the said supporting frame into raised and retracted position below said coal chute and between the ends thereof, said supporting wheels when in lowered and effective position bearing the weight of said supporting frame and of said power unit and of said transmission means and of said coal chute and serving as a pivot or fulcrum upon which the relatively lighter and discharge end portion of said coal chute may be lifted off from carrying position on the body of an automotive vehicle coal truck and raised back into carrying position thereon, said device including means for raising and lowering the said retractable wheel-bearing carriage relative to the said supporting frame including a traveling carriage slidably mounted upon the said supporting frame, means including a manually operable member carried by said supporting frame for slidably moving said traveling carriage upon and relative to said supporting frame, and means operatively interconnecting the said traveling carriage and the said retractable wheel-bearing carriage so that slidable movement of said traveling carriage upon and relative to said supporting frame is transmitted into pivoted lowering and raising or retracting movement of said wheel-bearing carriage upon and relative to the said supporting frame, the said retractable wheel-bearing carriage including a pair of wheel-supporting arms each pivotally mounted at one end upon the said supporting frame, each of the said wheel-supporting arms having mounted thereon at the underside thereof a rotatable member and each of the said rotatable members being rotatable in a plane at right angles to the plane in which the supporting wheel carried by the corresponding one of said supporting arms rotates whereby the said coal truck unloading device may be moved in a direction transverse relative to its long axis after the said coal truck unloading device has been removed from carrying position upon a coal truck and the said retractable wheel-bearing carriage and the said supporting wheels carried thereby have been moved into raised or retracted and ineffective position.

13. A portable unloading device comprising a supporting frame, said portable unloading device including the following parts carried by said supporting frame: an elongated chute, a flexible endless conveyor for conveying material along said chute from the receiving end to the discharging end thereof, a power unit, power transmission means operable by the said power unit for operating the said flexible endless conveyor, a retractable wheel-bearing carriage mounted upon the said supporting frame and movable relative thereto, supporting wheels carried by the said retractable wheel-bearing carriage, means for raising and lowering the said retractable wheel-bearing carriage relative to the said supporting frame, the said supporting wheels when in lowered or effective and supporting position being disposed between the ends of the said portable unloading device and providing a fulcrum between the ends of the said portable unloading device with the major portion of the said elongated chute projecting beyond the said supporting wheels and the fulcrum afforded thereby and providing an elongated lever arm for manipulating the said portable unloading device about the said fulcrum as a first class lever, and means arranged adjacent the coal-receiving end portion of said coal chute for releasably attaching said device upon an automotive vehicle truck for transportation thereby, said attaching means including a supporting member adapted to be mounted upon an automotive vehicle coal truck and a supporting member mounted upon the said coal truck unloading device adjacent the coal receiving end portion thereof and detachably attachable to the said first-named supporting member and releasable from engagement therewith by lowering the said wheel-bearing supporting carriage and the said supporting wheels carried thereby into lowered and effective position and then depressing the discharge end portion of said coal chute about said supporting wheels as a pivot or fulcrum so as to raise the said coal-receiving end portion of said device and thus detach the said second-named supporting member from the said first-named supporting member.

14. In combination with an automotive vehicle truck, a portable truck unloading device adapted to be carried by and for use with automotive vehicle trucks comprising a supporting frame, said portable truck unloading device including the following parts carried by said supporting frame: an elongated chute, a flexible endless conveyor for conveying material along said chute from the receiving end to the discharging end thereof, a power unit, power transmission means operable by the said power unit for operating the said flexible endless conveyor, a retractable wheel-bearing carriage mounted upon the said supporting frame and movable relative thereto, supporting wheels carried by the said retractable wheel-bearing carriage, means for raising and lowering the said retractable wheel-bearing carriage relative to the said supporting frame, the said supporting wheels when in lowered or effective and supporting position being disposed between the ends of the said portable truck unloading device and providing a fulcrum between the ends of the said portable truck unloading device with the major portion of the said elongated chute projecting beyond the said supporting wheels and the fulcrum afforded thereby and providing an elongated lever arm for manipulating the said portable truck unloading device about the said fulcrum as a first class lever, means for suspending one end portion of the said portable truck unloading device from an automotive vehicle truck for movement relative to the said automotive vehicle coal truck and for transportation therewith, and means arranged adjacent the coal-receiving end portion of said coal chute for releasably attaching said device upon an automotive vehicle truck for transportation thereby, said attaching means including a supporting member adapted to be mounted upon an automotive vehicle coal truck and a supporting member mounted upon the said coal truck unloading device adjacent the coal receiving end portion thereof and detachably attachable to the said first-named supporting member and releasable from engagement therewith by lowering the said wheel-bearing supporting carriage and the said supporting wheels carried thereby into lowered and effective position and then depressing the discharge end portion of said coal chute about said supporting wheels as a pivot or fulcrum so as to raise the said coal-receiving end portion of said device and thus detach the said second-named supporting member from the said first-named supporting member.

15. The combination with an automotive vehicle coal truck of a portable coal truck unloading device adapted to be carried by and for use with automotive vehicle coal truck comprising a supporting frame, said portable coal truck unloading device including the following parts carried by said supporting frame: an elongated coal chute, a flexible endless conveyor for conveying coal along said coal chute from the coal-receiving end to the coal-discharging end thereof, a power unit, power transmission means operable by the said power unit for operating the said flexible endless conveyor, a retractable wheel-bearing carriage mounted upon the said supporting frame and movable relative thereto, supporting wheels carried by the said retractable wheel-bearing carriage, and means for raising and lowering the said retractable wheel-bearing carriage relative to the said supporting frame, the said supporting wheels when in lowered or effective and supporting position being disposed between the ends of the said portable coal truck unloading device and providing a fulcrum between the ends of the said portable coal truck unloading device with the major portion of the said elongated coal chute projecting beyond the said supporting wheels and the fulcrum afforded thereby and providing an elongated lever arm for manipulating the said portable coal truck unloading device about the said fulcrum as a first class lever, means for swivelly suspending one end portion of the said portable coal truck unloading device from an automotive vehicle coal truck for transportation therewith, and means including a manually operable latch member latchingly engageable with a portion of the said elongated coal chute for releasably retaining the said coal chute upon the said automotive vehicle coal truck for transportation therewith.

16. The combination with an automotive vehicle coal truck of a portable wheel-bearing coal truck unloading device adapted to be removably mounted upon said automotive vehicle coal truck for transportation therewith from a coal-loading location to a coal-unloading location, said coal truck unloading device including a supporting frame, a substantially channel-shaped coal chute having a coal-receiving end portion mounted upon the body of said supporting frame and having a coal-discharging end portion projecting beyond and remote from the body of said supporting frame, a flexible endless conveyor belt for conveying coal along said coal chute from the coal-receiving end portion to the coal-discharging end thereof, a power unit carried by the body of said supporting frame adjacent the said coal-receiving end portion of said coal chute, said device including power transmission means arranged adjacent the said coal-receiving end portion of said coal chute and operable by said power unit for driving said conveyor belt, a retractable wheel-bearing carriage arranged below the body of said supporting frame and pivotally connected thereto, a pair of supporting wheels mounted upon said wheel-bearing carriage below and intermediate the ends of said coal chute, means including a manually operable member carried by said supporting frame for pivoting the said wheel-bearing carriage and the said supporting wheels carried thereby relative to the said supporting frame into lowered and effective position below the said coal chute and between the ends thereof and for retracting the said wheel-bearing carriage and the said supporting wheels carried thereby relative to the said supporting frame into raised and retracted position below said coal chute and between the ends thereof, said supporting wheels when in lowered and effective position bearing the weight of the said supporting frame and of said power unit and of said transmission means and of said coal chute and serving as a pivot or fulcrum upon which the relatively lighter and discharge end portion of said coal chute may be lifted off from carrying position on the body of said automotive vehicle coal truck and raised back into carrying position thereon, said portable truck-unloading device including means for raising and lowering the said retractable wheel-bearing carriage relative to the said supporting frame, and means for suspending one end portion of the said portable coal truck unloading device and the weight of the said end portion of said portable coal truck unloading device from the said automotive vehicle coal truck itself when the said portable wheel-bearing coal truck unloading device is disposed in carrying but ineffective position upon the body of said automotive vehicle coal truck.

17. The combination with an automotive vehicle coal truck of a portable wheel-bearing coal truck unloading device adapted to be removably mounted upon said automotive vehicle coal truck for transportation therewith from a coal-loading location to a coal-unloading location, said coal-truck unloading device including a supporting frame, a substantially channel-shaped coal chute having a coal-receiving end portion mounted upon the body of said supporting frame and having a coal-discharging end portion projecting beyond and remote from the body of said supporting frame, a flexible endless conveyor belt for conveying coal along said coal chute from the coal-receiving end portion to the coal-discharging end thereof, a power unit carried by the body of said supporting frame adjacent the said coal-receiving end portion of said coal chute, said device including power transmission means arranged adjacent the said coal-receiving end portion of said coal chute and operable by said power unit for driving said conveyor belt, a retractable wheel-bearing carriage arranged below the body of said supporting frame and pivotally connected thereto, a pair of supporting wheels mounted upon said wheel-bearing carriage below and intermediate the ends of said coal chute, means including a manually operable member carried by the said supporting frame for pivoting the said wheel-bearing carriage and the said supporting wheels carried thereby relative to the said supporting frame into lowered and effective position below said coal chute and between the ends thereof and for retracting the said wheel-bearing carriage and the said supporting wheels carried thereby relative to the said supporting frame into raised and retracted position below said coal chute and between the ends thereof, said supporting wheels when in lowered and effective position bearing the weight of said supporting frame and of said power unit and of said transmission means and of said coal chute and serving as a pivot or fulcrum upon which the relatively lighter and discharge end portion of said coal chute may be lifted off from carrying position on the body of said automotive vehicle coal truck and raised back into carrying position thereon, said device including means for raising and lowering the said retractable wheel-bearing carriage relative to the said supporting frame, and means for swivelly suspending one end portion of the said portable coal truck unloading device and the weight of the said end portion of said portable coal truck unloading device from the said automotive vehicle coal truck itself when the said portable wheel-bearing coal truck unloading device is in carrying but ineffective position upon the body of said automotive vehicle coal truck.

18. The combination with an automotive vehicle coal truck of a portable wheel-bearing coal truck unloading device adapted to be removably mounted upon said automotive vehicle coal truck for transportation therewith from a coal-loading location to a coal-unloading location, said coal-truck unloading device including a supporting frame, a substantially channel-shaped coal chute having a coal-receiving end portion mounted upon the body of said supporting frame and having a coal-discharging end portion projecting beyond and remote from the body of said supporting frame, a flexible endless conveyor belt for conveying coal along said coal chute from the coal-receiving end portion to the coal-discharging end thereof, a power unit carried by the body of said supporting frame adjacent the said coal-receiving end portion of said coal chute, said device including power transmission means arranged adjacent the said coal-receiving end portion of said coal chute and operable by said power unit for driving said conveyor belt, a retractable wheel-bearing carriage arranged below the body of said supporting frame and pivotally connected thereto, a pair of supporting wheels mounted upon said wheel-bearing carriage below and intermediate the ends of said coal chute, means including a manually operable member carried by said supporting frame for pivoting the said wheel-bearing carriage and the said supporting wheels carried thereby relative to said supporting frame into lowered and effective position below said coal chute and between the ends thereof and for retracting the said wheel-bearing carriage and the said supporting wheels carried thereby relative to the said supporting frame into raised and retracted position below said coal chute and between the ends thereof, said supporting wheels when in lowered and effective position bearing the weight of said supporting frame and of said power unit and of said transmission means and of said coal chute and serving as a pivot or fulcrum upon which the relatively lighter and discharge end portion of said coal chute may be lifted off from carrying position on the body of an automotive vehicle coal truck and raised back into carrying position thereon, said device including means for raising and lowering the said retractable wheel-bearing carriage relative to the said supporting frame, and means for swivelly suspending one end portion of the said portable coal truck unloading device and the weight of the said end portion of said portable coal truck unloading device from the said automotive vehicle coal truck itself when the said coal truck unloading device is in carrying but ineffective position upon the body of said automotive vehicle coal truck, said suspending means including a member swivelly mounted upon the said automotive vehicle coal truck and a cooperating member carried by the said portable coal truck-unloading device.

19. The combination with an automotive vehicle coal truck of a portable wheel-bearing coal truck unloading device adapted to be removably mounted upon said automotive vehicle coal truck for transportation therewith from a coal-loading location to a coal-unloading location, said coal-truck unloading device including a supporting frame, a substantially channel-shaped coal chute having a coal-receiving end portion mounted upon the body of said supporting frame and having a coal-discharging end portion projecting beyond and remote from the body of said supporting frame, a flexible endless conveyor belt for conveying coal along said coal chute from the coal-receiving end portion to the coal-discharging end thereof, a power unit carried by the body of said supporting frame adjacent the said coal-receiving end portion of said coal chute, said device including power transmission means arranged adjacent the said coal-receiving end portion of said coal chute and operable by said power unit for driving said conveyor belt, a retractable wheel-bearing carriage arranged below the body of said supporting frame and pivotally connected thereto, a pair of supporting wheels mounted upon said wheel-bearing carriage below and intermediate the ends of said coal chute, means including a manually operable member carried by said supporting frame for pivoting the said wheel-bearing carriage and the said supporting wheels carried thereby relative to said supporting frame into lowered and effective position below said coal chute and between the ends thereof and for retracting the said wheel-bearing carriage and the said supporting wheels carried thereby relative to the said supporting frame into raised and retracted position below said coal chute and between the ends thereof, said supporting wheels when in lowered and effective position bearing the weight of said supporting frame and of said power unit and of said transmission means and of said coal chute and serving as a pivot or fulcrum upon which the relatively lighter and discharge end portion of said coal chute may be lifted off from carrying position on the body of an automotive vehicle coal truck and raised back into carrying position thereon, said device including means for raising and lowering the said retractable wheel-bearing carriage relative to the said supporting frame, means for swivelly suspending one end portion of the said portable coal truck-unloading device and the weight of the said end portion of said portable coal truck-unloading device from the said automotive vehicle coal truck itself when the said coal truck-unloading device is in carrying but ineffective position upon the body of said automotive vehicle coal truck, and means for removably fastening the said portable coal truck-unloading device between its ends upon the said automotive vehicle coal truck for transportation therewith.

EUGENE H. HELLER.